United States Patent [19]

Moustakas et al.

[11] Patent Number: 4,542,536

[45] Date of Patent: Sep. 17, 1985

[54] DEVICE AND METHOD FOR REDUCING LEVEL DYNAMICS IN AN OPTICAL TRANSMISSION SYSTEM

[75] Inventors: Steven Moustakas; Hans Witte, both of Munich, Fed. Rep. of Germany

[73] Assignee: Siemens Aktiengesellschaft, Berlin & Munich, Fed. Rep. of Germany

[21] Appl. No.: 463,486

[22] Filed: Feb. 3, 1983

[30] Foreign Application Priority Data

Feb. 4, 1982 [DE] Fed. Rep. of Germany ....... 3203828

[51] Int. Cl.$^4$ .............................................. H04B 9/00
[52] U.S. Cl. ..................................... 455/607; 455/612
[58] Field of Search ................. 455/606, 607, 618, 619

[56] References Cited

U.S. PATENT DOCUMENTS 4,027,153  5/1977  Käch ...................................... 455/607
4,426,662  1/1984  Skerlos et al. ........................ 455/619

OTHER PUBLICATIONS

Mims, Forrest M., "Communicate Over Light Beams with the First Single-LED Transceiver", Mar. 1974.

Primary Examiner—Robert L. Griffin
Assistant Examiner—Timothy K. Greer
Attorney, Agent, or Firm—Hill, Van Santen, Steadman & Simpson

[57] ABSTRACT

A device and method for reducing level dynamics in an optical star bus transmission system is disclosed wherein variable electrical resistors are connected in series to the electro-optical transmission elements of the system transmitters and are selectively adjusted so that differences in the signal power levels at a selected system receiver are reduced to zero, and hence the differences in the signal power levels at the remaining system receivers are substantially reduced. Furthermore, variable electrical resistors are connected in series to the gain controlling resistors of the amplifier stages of the receivers of the system so that when any specific transmitter couples power into the system, differences in the output levels of the amplifier stages of the receivers are also substantially reduced. The invention may be practiced with trimming potentiometers.

3 Claims, 3 Drawing Figures

DEVICE AND METHOD FOR REDUCING LEVEL DYNAMICS IN AN OPTICAL TRANSMISSION SYSTEM

BACKGROUND OF THE INVENTION

1. Field of the Invention

This invention relates to a device and method for reducing light level dynamics in an optical transmission system.

2. The Prior Art

Optical transmission systems may involve a network of many sending/receiving stations interconnected by means such as light conducting fibers and mixing elements such as star couplers. The use of star couplers is disclosed in an article by Hudson, et al, "The Star Coupler: A Unique Interconnection Component for Multimode Optical Waveguide Communications Systems," *Applied Optics,* Vol. 13, No. 11, November 1974, pp. 2540–2545. Another optical coupler for connecting light conducting fibers is disclosed in German Offlengungsschrift No. 29 15 114 (corresponding to U.S. Pat. No. 4,362,357).

In such optical transmission systems, the problem is often presented that the optical powers coupled into the system from the transmitters exhibit different levels at the receiver locations. Such level dynamics are caused by factors such as different coupler insertion losses and fiber attenuations on each of the links between each transmitter and each receiver. Depending upon the dynamic range, equalisation of compensation of these power fluctuations means a considerable expense in additional receiver circuitry. If left uncompensated, the level dynamics may result in an increased error rate.

SUMMARY OF THE INVENTION

The present invention is directed to providing a device and method for reducing level dynamics, which are simple and economical, yet which reduce level dynamics to the greatest possible degree. These tasks are achieved by providing a variable electrical resistor in a transmitter or receiver to compensate for level dynamics by regulating the operating power or receiver amplifier gain, respectively.

According to the invention, a variable electric resistor is placed in series with the light emitting device of the transmitter circuitry. The resistor is set so that the optical power level at a desired receiver is at a desired level. By providing resistors at all transmitters in an optical transmission system, the operating power in each transmitter may be adjusted so that the same level of optical power at the same desired receiver is obtained regardless of which transmitter the signal originated. It is contemplated that the variable resistor may be a trimming potentiometer in series with an electro-optical transmission element such as a light-emitting diode.

As previously described, the power fluctuations at a specific receiver can be completely compensated for by means of a variable resistor at each transmitter. In an optical transmission system having an ideal star coupler which distributes the power at any input port evenly amongst all output ports, the power fluctuations at the input of any remaining receivers in the transmission system are also zero. Generally speaking however, in an optical transmission system having a non-ideal star coupler the power fluctuations at the input of any remaining receivers in the transmission system will be substantially reduced but not always to zero.

In addition to the above, when any specific transmitter couples optical power into the system, the resulting level dynamics at the outputs of the amplifier stages of the receivers can be easily compensated for. According to the invention, a variable electric resistor is placed in series with a resistor in the amplifier stage of the receiver circuitry which can control the magnitude of the amplifier gain. The resistor is set so that the amplifier output level due to the optical power coupled into the system from a specific transmitter is at a desired level. By providing resistors at all receivers in an optical transmission system, the magnitude of the amplifier gain in each receiver may be adjusted so that the same output level is obtained at each amplifier due to the optical power coupled into the system from the same specific transmitter. It is contemplated that the variable resistor may be a trimming potentiometer in series with a resistor in the main amplifier of the receiver circuitry which can control the magnitude of the amplifier gain.

As previously described, the output level fluctuations at the outputs of the amplifier stages of the receivers due to the power coupled into the system from a specific transmitter can be completely compensated for by means of a variable resistor at each receiver. In an optical transmission system having an ideal star coupler which distributes the power at any input port evenly amongst all output ports, the output level fluctuations at the outputs of the amplifier stages of the receivers due to the power coupled into the system from any remaining transmitters in the transmission system are also zero. Generally speaking however, in an optical transmission system having a non-ideal star coupler, the output level fluctuations at the outputs of the amplifier stages of the receivers due to any remaining transmitter in the transmission system will be substantially reduced but not always to zero.

DESCRIPTION OF THE PREFERRED EMBODIMENT

Figure 1:
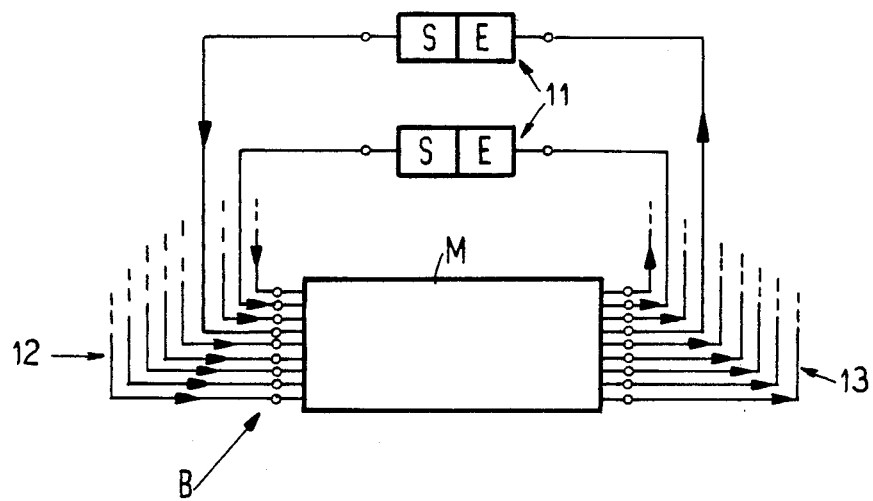
FIG. 1 is a schematic diagram of an optical star bus transmission system.

The principles of the present invention are particularly useful in an optical transmission system such as shown in FIG. 1. In its general organization, the system includes a plurality of stations 11 each having a transmitter S and a receiver E with corresponding plugs, a plurality of light conducting fibers for carrying signals of modulated light, and a coupler or mixer M such as shown in star bus B. In such a star coupler, fibers 12 proceed to the mixer M and a corresponding plurality of fibers 13 departs therefrom. A light signal supplied to the mixer in any fiber whatsoever is distributed to all outgoing fibers. The direction of light signal travel is indicated by arrowheads. The points indicated on the lines represent fiber connections such as plug-type connections or splices.

The information output of any transmitter S, in the form of modulated light, proceeds to all receivers E of the subscriber stations 11 over the star bus B. Due to the different connection losses and fiber attenuations or lengths as well as an irregular distribution of the light by the mixer M, the light powers at the location of a specific receiver E fluctuate as a function of the transmitter S source of origin of the signals, even when each transmitter outputs the same optical power. The level dynamic range typically may amount to more than 5 dB.

Figure 2:
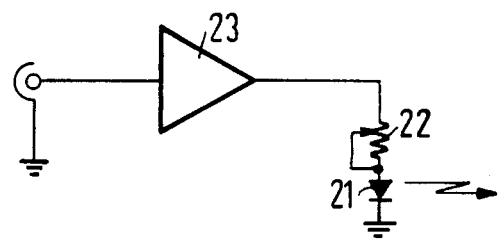
FIG. 2 is a schematic diagram of a portion of the circuitry of an electro-optical transmitter as used in the system of FIG. 1 embodying the principles of the invention.

The power fluctuations at a specific receiver E can be fully compensated for my means of a variable electrical resistor in each of the transmitters S. A portion of a transmitter having such a resistor is illustrated in FIG. 2. Electrical current is supplied to an electro-optical transmission element such as a light-emitting diode 21 by a driver 23. Connected in series with the diode 21 there is a trimming potentiometer 22. The trimming potentiometer 22 regulates the current supplied to the diode 21 thereby also regulating the diode output level. By providing such a potentiometer 22 at each of the transmitters S of each station 11, the output of each transmitter may be set so that the signals received at any specific receiver E will all be at an identical, predeterminable level. The signal power fluctuations at any of the remaining receivers E will generally be substantially reduced although not always to zero.

Figure 3:
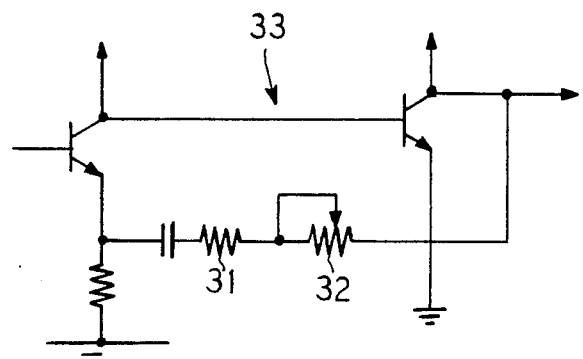
FIG. 3 is a schematic diagram of a portion of the circuitry of an opto-electrical receiver as used in the system of FIG. 1 embodying the principles of the invention.

In addition to the above, when any specific transmitter S couples optical power into the system, there is a variation in the received power levels at the receivers E due to connection, fiber attenuation, and coupler losses. When the bus is to function with receivers having identical operating parameters, particularly receiver sensitivity and the threshold level of the comparator, then it is desirable to have electrical power levels at the outputs of the amplifier stages of the receivers as nearly equal as possible. This may be achieved by providing variable electrical resistors at the receivers as illustrated in FIG. 3. The electrical power output of the amplifier 33 is regulated by a trimming potentiometer 32 connected in series with the amplifier gain controlling resistor 31. By selectively adjusting the potentiometers, the output level of the amplifiers 33 of each of the receivers E may be set to a common value.

Thus, it may be seen that the invention enables adjustment of the output levels of the transmitters S to be set to compensate for losses on the transmitter side of the mixer M, while the receivers may be adjusted to compensate for losses on the receiver side of the mixer. Long-term changes of the attenuations on the various fiber lengths can be compensated for by means of manual re-adjustment of the trimming potentiometers 22 and 32.

Although various minor modifications may be suggested by those versed in the art, it should be understood that we wish to embody within the scope of the patent warranted hereon all such modifications as reasonably and properly come within the scope of our contribution to the art.

We claim:

1. A method for reducing level dynamics in an optical transmission system having at least two electro-optical transmitters for sending optical signals of modulated light, at least two opto-electrical receivers for receiving said signals, and a plurality of light-conducting fibers connected to and from an optical star bus for carrying said signals from said transmitters to said receivers, said signals normally arriving at said receivers at different power levels, and said receivers, for a given received optical power level, generating a corresponding electrical output level at a given point in the receiver which may differ from receiver to receiver in comparison to one another, said method comprising the steps of:

providing selectively adjustable means in each of said transmitters for controlling an output optical power level of each of said transmitters;

providing selectively adjustable means in each of said receivers for controlling the electrical output level at said given point in each of said receivers;

adjusting said adjustable means in each of said transmitters so that at a selected receiver each of the transmitters generates the same electrical output level; and thereafter adjusting said adjustable means in each of said receivers so that when one specific transmitter which was previously adjusted is transmitting optical power into the system, the same electrical output level at said given point in said selected receiver is provided at said given point in all of the other receivers;

whereby level dynamics of signals received at any of the receivers relative to the other receivers when any one of the transmitters is transmitting is substantially reduced.

2. A method according to claim 1 wherein a potentiometer is used in series with an electro-optical transmission element in each of said transmitters.

3. A method according to claim 1 wherein a potentiometer is connected to vary gain of an amplifier in each of the receivers.

* * * * *